Oct. 29, 1957   F. A. HOWARD   2,811,189
PNEUMATIC TIRE
Filed Dec. 24, 1949
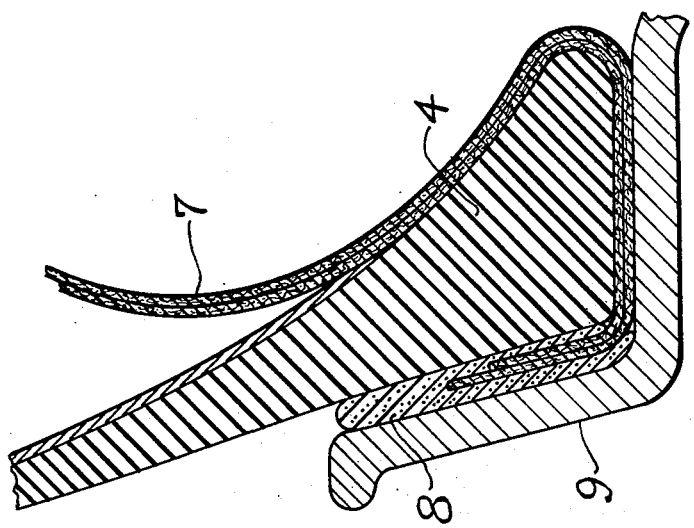
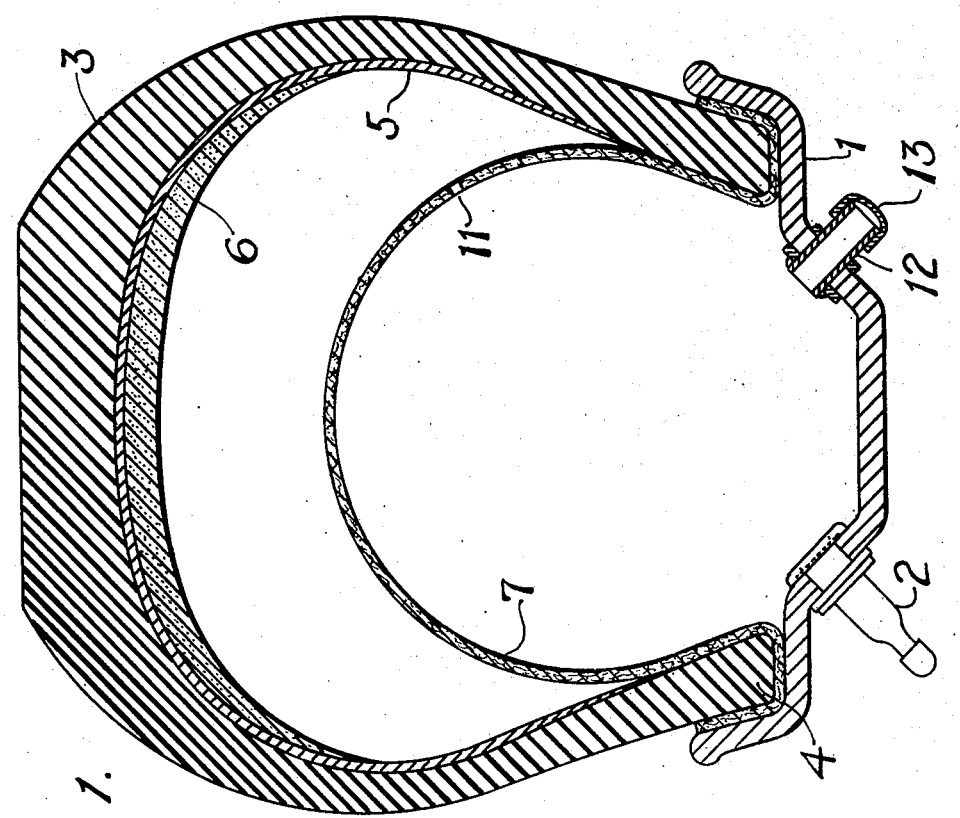
INVENTOR.
FRANK A. HOWARD
BY
ATTORNEYS

United States Patent Office 2,811,189
Patented Oct. 29, 1957

2,811,189

PNEUMATIC TIRE

Frank A. Howard, New York, N. Y.

Application December 24, 1949, Serial No. 134,957

11 Claims. (Cl. 152—342)

My invention relates to penumatic tires and more specially to a tubeless tire construction embodying an auxiliary ring.

The invention will be understood from the following specifications taken in connection with the annexed drawings in which:

Figure 1 is a cross section through a rim and tubeless tire embodying my invention, and Figure 2 is an enlarged section through the tire bead portion of the assembly.

Referring to Figure 1, the numeral 1 indicates a one-piece metal rim of the drop-center straight-side type now commonly used for automobile wheels. A unitary valve assembly 2 of standard construction may be inserted in a hole in the rim and fastened in place to make an airtight connection with the rim. The tire casing 3 is of the usual U-shaped straight-side construction, the tire beads 4 having a loose circumferential fit on the rim 1. The tire casing preferably has a complete lining of thin rubber of a quality selected for its impermeability to air, such as the co-polymer of isobutylene with small percentages of isoprene known to the trade as Butyl rubber. This lining is indicated by the numeral 5. There may also be a second lining made up of a suitable soft rubber composition, indicated at 6, which covers the tread and shoulder portions of the inner tire face and serves to seal punctures in a manner now well understood. The construction so far described is that of a known type of tubeless vehicle tire and rim. Under the internal air pressure applied through the valve 2 the tire beads are forced axially outward into tight contact with the flanges of the rim, and if the rim surface be perfect, the outer faces of the tire beads form an air-tight seal against the rim flanges. Sometimes this seal is perfected by application of cement, sometimes by reliance upon rubber rings or facing on the outer surface of the tire bead. Such a tire has the advantage of simplicity and low cost, the further advantage of reduced friction under bending, and the elimination of several disadvantages inherent in the use of inner tubes. The tubeless construction has, however, many well-recognized disadvantages of its own, and it is the particular object of the present invention to provide practical and economical means for overcoming these disadvantages.

In accordance with my invention, there is provided a substitute for an inner tube in the form of a supplementary or safety ring designated 7 shaped like the Greek letter omega in cross section, the outwardly facing flanges receiving the bead portions of the casing 3, as clearly shown in Figure 1. One advantageous construction for such an omega ring is illustrated in detail in Figure 2. The ring is made up of two plies or layers of tire fabric or cords cemented and coated by relatively thin films of rubber, except on the upstanding portion of the flange where there is a relatively thick and soft rubber coating designated 8 which lies between the outer face of the tire bead 4 and the vertical rim flange 9. The two plies of fabric which make up the body of the ring 7 lie in the center of the flange portion 8 so that the soft rubber making up the flange bears against the tire bead 4 as well as the rim flange 9. Preferably the soft rubber flange 8 has slightly tacky surfaces so that when once brought into contact with the tire bead and rim flange it will tend to adhere unless displaced with some force, and to form the seal more easily the faces of the flange 9 may have continuous circumferential corrugations which compress to a substantially flat surface under pressure.

The omega ring 7 is substantially impermeable due to its rubber coating but may be provided with a minute leakage hole or slow-leak opening designated 11, as is common in the so-called "safety tubes." The leakage hole is preferably located on the flank of the ring, as shown in Figure 1, so that it will not become filled or clogged by the puncture-sealing lining 6 in the event the tire becomes deflated.

As an additional improvement in the construction, I may employ a supplementary valve designated 12 and shown in Figure 1 as being located on the right side of the rim in the same position as the normal valve 2. This is for simplicity of illustration only. I prefer to mount the second valve 12 on the same side of the rim as the normal valve 2 but at 180° distant therefrom, so as to serve as a perfect counterbalance for the normal valve. The valve 2 may be of special construction or it may be a standard valve from which the valve mechanism has been removed leaving only the cap 13 as a closure. As will later appear, the correct functioning of the supplementary valve 12 requires that it have a wide-open air passage of substantial size.

In assembling the construction shown and described, the omega ring 7 is first installed in the casing 3. The flanges 8 of the omega ring may be pressed against the beads 4 of the casing, by hand, with sufficient force to cause them to adhere slightly. The casing carrying the ring is then mounted on the rim 1 in the usual way, utilizing the drop-center portion of the rim. It should be noted that the thickness of the cylindrical portions of the flanges on the omega ring is less than the circumferential clearance normally provided between the tire bead and the face of the rim, so that the ring may be used with an ordinary casing and rim designed for use with an inner tube. To complete the mounting operation, the cap 13 on the supplementary valve 12 is removed and a large volume of gas under high pressure is admitted suddenly through this supplementary valve into the annular chamber created by the omega ring and the rim 1. It will be noted that this chamber is very much smaller in cross section and in volume than the casing 3 so that it is easier to build some internal pressure rapidly even though there is at the outset considerable leakage under the beads. The pressure may be applied either by a hose connection from the ordinary tire inflation tank, or it may be applied from a large or small gas cylinder, such as a $CO_2$ gas cylinder. The effect of this very quick increase in gas pressure withing the small chamber between the rim and the omega ring is to force both beads of the tire firmly outward against the flanges 9 of the rim, and especially if the surfaces of the ring flange 8 are slightly tacky, this contact when once made remains reasonably tight. When this initial inflation step, the purpose of which is to form the initial seal between the beads of the tire and the rim flange 9, has been carried out, the cap 13 may be replaced on the supplementary valve 12. It is immaterial whether the internal pressure is wholly released at this time or not. The final inflation of the tire up to the desired pressure is now carried out in the usual way through the standard valve 2.

As described in the foregoing, the omega ring is a separate member which is first applied to the tire casing when the tire is mounted on the rim. It may, however, be an integral part of the tire casing, permanently cemented or vulcanized in place.

The complete tire of my invention has numerous advantages over earlier forms of pneumatic tires. It may be made by combining the omega ring with a standard type of tire casing at the time of mounting the casing on the rim, the omega ring then replacing the usual inner tube and giving the advantages of a tubeless tire, and also the advantages of a tire having a "safety" tube. Thus in the event of a casing failure or blowout, the omega ring remains inflated for a time sufficient to permit slowing up or stopping the vehicle, and the dangers attendant upon sudden and complete deflation of a pneumatic tire at high speeds are avoided.

Because of the omega ring, it is possible to use rims which would otherwise be impractical for tubeless tires. Two types of difficulties with tubeless tires are overcome. Firstly, it becomes much simpler and easier to establish an initial contact or seal between the rim flanges and the tire bead. The small capacity of the gas chamber within the omega ring makes it easy to obtain the initial internal pressure required to force the beads against the rim flanges. A supplementary valve with a large open passage is useful but not essential for this initial step. If the vertical flanges of the omega ring are even slightly tacky, the initial seal thus obtained will be maintained until the inflation is completed through the regular valve, whether or not the initial pressure is maintained. In place of using the supplementary valve described, the regular valve, with the valve mechanism removed to provide a large open gas passage, may be used for this initial inflation, and the initial seal will not be lost when the initial pressure is relieved for the purpose of reinstalling the valve parts preparatory to final inflation.

Secondly, the rubber-faced vertical flanges of the omega ring eliminate the need for using cement between the tire beads and the rim flanges, or altering the tire molds to provide for rubber facing or integral sealing corrugations on the tire beads. Also it is possible to use a sufficient thickness of rubber on these flanges of the omega ring to seal against rim flanges which are quite imperfect.

The tire of my invention may have all of the following additional advantages:

There is no inner tube, therefore less thickness of material to flex and develop heat in the tire when rolling under a load.

Since it is in contact with the casing only near the bead, the omega ring, which substitutes for the inner tube, flexes very little in service, and neither creates heat in nor interferes with dissipation of heat from the upper side walls of the casing, or the tread and shoulders where flexure is greatest.

My construction permits the direct application of the puncture-sealing lining to the inner face of the casing, which is impractical when any form of inner tube is used.

It gives the same temporary protection against casing failure which is provided by a complete "safety inner tube."

In general, my construction provides a puncture-proof, blowout-safe, tubeless pneumatic tire, suitable for motor vehicles including airplanes, i. e. especially easy of mounting and inflation, and maintains a perfect final seal against rims which would be regarded as unsuitable for tubeless tires of other design. The omega ring, which substitutes for the inner tube, is relatively cheap, light, simple, and does not involve the important disadvantages inherent in an actual inner tube, either of the standard type or of the "safety" type.

While I have shown and described in considerable detail one embodiment of my invention and have referred to certain variants thereof, it will be understod that this is only for the purpose of clear exposition of the invention, and that I do not regard the invention as limited to these details or any of them, save insofar as such limitations are included within the terms of the following claims, in which it is my intention to claim all novelty inherent in my invention as broadly as is permissible in view of the prior art.

What I claim is:

1. In combination, an annular wheel rim having outwardly extending radial side flanges, a C-shaped tire mounted on said rim, and a separable safety wall interposed between the tire and the rim, said tire comprising a tread portion and side walls terminating in spaced beads circumferentially sealed on their outer side faces by axial outward pneumatic pressure within the tire resisted by the inner faces of the radial side rim flanges, said separable safety wall comprising an annular body of flexible inextensible pneumatically impermeable sheet material having spaced continuous circumferential margins removably anchored at the tire beads, and there sealed automatically against outward air flow by the axial outward pressure within the safety wall, the central portion of said body extending radially outward to a circumference substantially greater than the rim but less than that of the tire crown to provide inflation chambers inwardly and outwardly of said wall, and means in said wall for permitting the controlled passage of air between said chambers.

2. In combination, an annular wheel rim having outwardly extending radial side flanges, a C-shaped tire mounted on said rim, and a safety wall interposed between the tire and the rim, said tire comprising a tread portion and side walls terminating in spaced beads circumferentially sealed on their outer side faces by axial outward pneumatic pressure resisted by the inner faces of the radial side rim flanges, said safety wall comprising an annular body of flexible inextensible pneumatically impermeable sheet material having spaced continuous circumferential margins anchored at the tire beads, and there located between opposed circumferential surfaces having radial directional components to compress said margins axially between the outer surfaces of the beads and the inner surfaces of said side flanges under internal pressure of air within the safety wall, thus sealing them against outward air flow, the central portion of said body extending radially outward to a circumference substantially greater than the rim but less than that of the tire crown to provide inflation chambers inwardly and outwardly of said wall, and means in said wall for permitting the controlled passage of air between said chambers.

3. A pneumatic tire comprising in combination an outer air-tight casing of U-shaped cross section having beads adapted to seal by internal pressure against the side flanges of a channel rim, and a thinner flexible inner ring of similar section and substantially smaller than the interior of said casing, said inner ring normally contacting only the beads of said casing and having a slow leak opening connecting the space within said ring with the space between said ring and said casing, said inner ring being of cross section similar to the Greek capital letter omega providing channel shape flanges on the inner ring embracing said beads of said casing.

4. A pneumatic tire comprising in combination an outer air-tight casing of U-shaped cross section having beads adapted to seal by internal pressure against the side flanges of a channel rim, and a thinner flexible inner ring of similar section and substantially smaller than the interior of said casing, said inner ring normally contacting only the beads of said casing and having a slow leak opening connecting the space within said ring with the space between said ring and said casing, said inner ring being of cross section similar to the Greek capital letter omega providing channel shape flanges on the inner ring embracing said beads of said casing, the outer portion of said flanges having a soft rubber face.

5. A pneumatic tire comprising in combination an outer air-tight casing of U-shaped cross section having beads adapted to seal by internal pressure against the side flanges of a channel rim, and a thinner flexible inner ring of similar section and substantially smaller than the interior of said casing, said inner ring normally contacting only the beads of said casing and having a slow-leak opening connecting the space within said ring with the space between said ring and said casing, said inner ring being of cross section similar to the Greek letter omega providing channel shape flanges on the inner ring embracing said beads of said casing, the outer portion of said flanges having a soft rubber face.

6. A pneumatic tire comprising in combination an outer air-tight casing of U-shaped cross section having beads adapted to seal by internal pressure against the side flanges of a channel rim, and a thinner flexible inner ring of similar section and substantially smaller than the interior of said casing, said inner ring normally contacting only the beads of said casing and having a slow-leak opening connecting the space within said ring with the space between said ring and said casing, said inner ring being of cross section similar to the Greek letter omega providing channel shape flanges on the inner ring embracing said beads of said casing, the outer faces of said flanges in contact with said beads having a tacky surface.

7. A tubeless tire and rim assembly comprising a rigid air-impermeable rim provided with side flanges; a pneumatic tire including a U-shaped casing encircling said rim and a safety ring of smaller cross section interposed between said casing and said rim to define an outer inflatable chamber in the space encompassed by said casing and said ring and an inner inflatable chamber in the space encompassed by said ring and said rim; said casing having side walls terminating in beads, said ring being formed of relatively thin flexible inextensible material of strength and durability for limited service as an inner pneumatic tire upon complete deflation of said outer chamber and having a cross section of the general shape of the capital letter omega providing side channels which receive the respective beads of said casing, the upstanding marginal flanges of said channels having their outer faces formed of air-sealing material contacting the inner faces of said rim flanges to close the said inner inflatable chamber, the inner faces of said upstanding flanges contacting the exterior faces of said beads to close the said outer inflatable chamber; and means to inflate said inner and outer chambers whereby the resultant internal gas pressure in each inflatable chamber acts independently to force said casing beads outwardly toward said rim flanges to anchor structurally said casing and ring in relation to the rim and simultaneously to compress and hermetically seal the contacting surfaces on both sides of said ring flanges so long as there is gas pressure in either inflatable chamber.

8. A tire and rim assembly, as set forth in claim 7, wherein the upstanding marginal flanges of said channels extend to the full height of the rim side flanges so that their edges remain visible when the casing and ring are mounted on the rim.

9. A tubeless tire and rim assembly comprising: a rigid air-impermeable rim provided with side flanges; a pneumatic tire including a U-shaped casing encircling said rim and a separate safety ring of smaller cross-section interposed between said casing and said rim to define an outer inflatable chamber in the space encompassed by said casing and said ring and an inner inflatable chamber in the space encompassed by said ring and said rim; said casing having side walls terminating in beads, said ring being formed of relatively thin rubber-coated textile material of strength and durability for limited service as an inner pneumatic tire upon complete deflation of said outer chamber and having a cross-section of the general shape of the capital letter omega providing thin-bottomed side channels which receive the respective beads of said casing while still permitting them still to seat on the rim for which they were designed, the upstanding marginal flanges of said channels having their outer faces more thickly coated with rubber for contacting and sealing the inner faces of said rim flanges to close the said inner inflatable chamber, the inner faces of said upstanding flanges contacting the exterior faces of said beads to close the said outer inflatable chamber; and means to inflate said inner and outer chambers whereby the resultant internal gas pressure in each inflatable chamber acts independently to force said casing beads outwardly toward said rim flanges to anchor structurally said casing and ring in relation to the rim and simultaneously to compress and hermetically seal the contacting surfaces on both sides of said ring flanges so long as there is gas pressure in either inflatable chamber.

10. A tubeless tire and rim assembly comprising: a rigid air-impermeable rim provided with side flanges; a pneumatic tire including a U-shaped casing encircling said rim and a separate safety ring of smaller cross-section interposed between said casing and said rim to define an outer inflatable chamber in the space encompassed by said casing and said ring and an inner inflatable chamber in the space encompassed by said ring and said rim; said casing having side walls terminating in beads, said ring being formed of relatively thin flexible inextensible material of strength and durability for limited service as an inner pneumatic tire upon complete deflation of said outer chamber but being of slight permeability to permit controlled passage of air from said inner chamber to said outer chamber and having a cross-section of the general shape of the capital letter omega providing side channels which receive the respective beads of said casing, the upstanding marginal flanges of said channels having their outer faces formed of air-sealing material contacting the inner faces of said rim flanges to close the said inner inflatable chamber, the inner faces of said upstanding flanges contacting the exterior faces of said beads to close the said outer inflatable chamber; and means to inflate said inner and outer chambers whereby the resultant internal gas pressure in each inflatable chamber acts independently to force said casing beads outwardly toward said rim flanges to anchor structurally said casing and ring in relation to the rim and simultaneously to compress and hermetically seal the contacting surfaces on both sides of said ring flanges so long as there is gas pressure in either inflatable chamber.

11. A tubeless tire adapted to be mounted on a rigid air-impermeable rim provided with side flanges, said tire comprising a U-shaped casing for encircling said rim and a safety ring of smaller cross-section interposable between said casing and said rim to define an outer inflatable chamber in the space encompassed by said casing and said ring and an inner inflatable chamber in the space encompassed by said ring and said rim; said casing having side walls terminating in beads, said ring being formed of relatively thin flexible inextensible material of strength and durability for limited service as an inner pneumatic tire upon complete deflation of said outer chamber and having a cross-section of the general shape of the capital letter omega providing side channels adapted to receive the respective beads of said casing, the upstanding marginal flanges of said channels having their outer faces formed of air-sealing material for contacting the inner faces of said rim flanges to close the said inner inflatable chamber, the inner faces of said upstanding flanges contacting the exterior faces of said beads to close the said outer inflatable chamber.

References Cited in the file of this patent

UNITED STATES PATENTS

| | | |
|---|---|---|
| 1,295,604 | Roberts | Feb. 25, 1919 |
| 1,626,511 | Clark | Apr. 26, 1927 |
| 1,626,512 | Clark | Apr. 26, 1927 |
| 1,653,054 | Mack | Dec. 20, 1927 |
| 2,200,916 | Crowley | May 14, 1940 |